United States Patent
Takemoto et al.

(10) Patent No.: US 7,228,841 B2
(45) Date of Patent: Jun. 12, 2007

(54) FUEL SWITCHING FOR DUAL FUEL ENGINE

(75) Inventors: Akira Takemoto, Aki-gun (JP); Nobuhide Seo, Hiroshima (JP); Kazuho Douzono, Higashihiroshima (JP); Takuji Kawada, Canton, MI (US)

(73) Assignee: Mazada Motor Corporation, Hiroshima (JP)

( * ) Notice: Subject to any disclaimer, the term of this patent is extended or adjusted under 35 U.S.C. 154(b) by 0 days.

(21) Appl. No.: 11/268,331

(22) Filed: Nov. 7, 2005

(65) Prior Publication Data
US 2006/0101823 A1 May 18, 2006

(30) Foreign Application Priority Data
Nov. 12, 2004 (JP) ............................. 2004-329154
Aug. 19, 2005 (JP) ............................. 2005-238664

(51) Int. Cl.
*F02B 7/08* (2006.01)
*F02M 43/00* (2006.01)

(52) U.S. Cl. ..................... 123/304; 123/575; 60/706; 180/65.2

(58) Field of Classification Search ................ 123/1 A, 123/27 GE, 304, 575, 576, 577, 578, 525, 123/527; 60/706; 180/65.2, 65.4
See application file for complete search history.

(56) References Cited

U.S. PATENT DOCUMENTS 5,092,305 A    3/1992   King
5,437,250 A *  8/1995   Rabinovich et al. .......... 123/3
5,542,398 A *  8/1996   Marcon ..................... 123/527
6,250,260 B1 * 6/2001   Green ................... 123/27 GE
6,591,817 B2 * 7/2003   Deutsch ..................... 123/525
6,612,269 B2 * 9/2003   Heffel et al. ................ 123/1 A
6,889,126 B2 * 5/2005   Komiyama et al. .......... 701/22

FOREIGN PATENT DOCUMENTS

| DE | 101 46 063 A1 | 4/2003 |
| DE | 102 39 397 A1 | 11/2004 |
| FR | 2 840 361 A | 12/2003 |
| JP | H03-026835 A | 2/1991 |
| JP | H11-311136 A | 11/1999 |

OTHER PUBLICATIONS

European Search Report dated Dec. 30, 2005 for application No. EP 05023555.

* cited by examiner

*Primary Examiner*—Stephen K. Cronin
*Assistant Examiner*—Johnny H. Hoang

(57) ABSTRACT

An internal combustion engine combusts a first fuel or a second fuel. A method for controlling the engine comprises supplying first fuel to at least one combustion chambers of the internal combustion engine, stopping the supply of the first fuel to the combustion chamber in response to an engine operating condition, and fueling with the second fuel to the at least one combustion chamber after a predetermined period, so as to maintain an engine speed within a predetermined range.

19 Claims, 5 Drawing Sheets

FUEL SWITCHING FOR DUAL FUEL ENGINE

BACKGROUND OF THE INVENTION

The present invention generally relates to a dual fuel internal combustion engine selectively combusting first fuel and second fuel, and more particularly relates to switching fuel for a dual fuel internal combustion engine selectively combusting gasoline and gaseous hydrogen.

In recent years, for a lower tailpipe emission from internal combustion engines, dual fuel engines using together gaseous fuel, such as compressed natural gas, liquidized propane gas, or compressed hydrogen, and gasoline have been developed. For example, in Japanese patent application publication no. H03-26835, a dual fuel engine using together gasoline and gaseous hydrogen is described. Also, disclosed in Japanese patent application publication no. H11-311136 is a hybrid automotive vehicle using an electric motor as well as a dual fuel engine using bi-fuel of gasoline and gaseous hydrogen to drive the vehicle.

In a dual fuel engine that is capable of combusting gaseous hydrogen and/or gasoline, fuel injected into the engine cylinders or combustion chambers may be switched from gasoline to gaseous hydrogen. During the transition from gasoline to hydrogen, the initial charge may be ignited earlier than desired, thereby increasing temperature and pressure within the intake manifold. In particular, combustion of gasoline can elevate the temperature of certain combustion chamber surfaces and may also produce residual uncombusted carbon or other matter. These elements that remain in the combustion chamber may cause some of the injected hydrogen to increase temperature and pressure in the intake system. Furthermore, it may be possible during such conditions to combust gasoline that may remain in the intake manifold from prior gasoline injections (abnormal combustion).

Therefore, the inventors herein have recognized the above-mentioned disadvantages and has developed a method to transition an internal combustion engine from gasoline operation to hydrogen operation that offers substantial improvements.

BRIEF SUMMARY OF THE INVENTION

In one aspect of the present invention, the disadvantages of prior approaches are overcome by a method for controlling an internal combustion engine. The internal combustion engine combusts a first fuel or a second fuel. The method comprises supplying first fuel to at least one combustion chambers of the internal combustion engine, stopping the supply of the first fuel to the combustion chamber, and fueling with the second fuel to the at least one combustion chamber after a predetermined period.

In an alternative method of the present invention, the method comprises supplying first fuel to at least one combustion chambers of the internal combustion engine, stopping the supply of the first fuel to the combustion chamber, scavenging at least a portion of the first fuel from remaining in the at least one combustion chamber; and fueling the at least one combustion chamber with the second fuel after the fuel scavenging.

In another aspect of the present invention, a vehicle powertrain is provided comprising an internal combustion engine combusting a first fuel or a second fuel, a fuel supply system configured to selectively supply the first fuel or the second fuel to combustion chambers of the internal combustion engine, and a control system. The control system is configured to control the fuel supply system to supply the first fuel to at least one of the combustion chambers, stop the supply of the first fuel to the at least one combustion chamber, and fuel with the second fuel to the at least one combustion chamber after a predetermined period.

In further another aspect of the present invention, there is provided a computer readable storage medium having stored data representing instructions executable by a computer to control an internal combustion engine combusting a first fuel or a second fuel. The storage medium comprises the instructions to supply the first fuel to at least one combustion chamber of the internal combustion engine, stop the supply of said first fuel to said at least one combustion chamber, and fuel with the second fuel to the at least one combustion chamber after a predetermined period.

According to the above aspects of the invention, by stopping the supply of the first fuel to the at least one combustion chamber, the combustion chamber and an intake system of the internal combustion engine may be scavenged so that the occurrence of abnormal combustion can be prevented. The supply of the first fuel may be stopped in response to an engine operating condition. Further the engine operating condition may be switching fuel from the first fuel to the second fuel determined to be done based on driving condition of a vehicle equipped with the internal combustion engine. So, the engine operating condition may be engine load, such as derived from sensors detecting an engine intake airflow, an intake manifold pressure, or an accelerator pedal position, engine speed, residual fuel amount remaining in a fuel tank, a request from a vehicle operator, a geographical location where a vehicle with the internal combustion engine is running, or other vehicle operating condition.

In one embodiment of the present invention, the engine speed may be maintained within a predetermined range during the predetermined period, so that a stable driving state can be sustained.

In an alternative embodiment of the present invention, the internal combustion engine may be part of a vehicle powertrain having an electric motor capable of supplying torque to the internal combustion engine, so as to maintain the engine speed within the predetermined range.

In a further alternative embodiment of the present invention, the engine speed may be increased prior to the predetermined period, so as to maintain the engine speed within the predetermined range during the period.

In a still further alternative embodiment, the internal combustion engine may be part of a vehicle powertrain having an electric motor capable of generating torque to the internal combustion engine and a battery for storing and supplying electric energy to the electric motor. The output torque of electric motor may be increased during the predetermined period in response to a first operating condition of the battery, and the engine speed may be increased prior to the predetermined period in response to a second operating condition of the battery, so as to maintain the engine speed within the predetermined range. The electric motor may be a plurality of motors, such as two electric machines at least one of which is usually generating electric energy as a generator but occasionally generating output torque or mechanical energy in a hybrid electric vehicle powertrain. The first operating condition of the battery may be a state of charge (SOC) of the battery above a predetermined value, and the second operating condition of the battery may be a SOC below the predetermined value.

In the above embodiment, the vehicle powertrain may further comprise an electric generator driven by the internal combustion engine and generating electric energy to selectively supply it to the electric motor and the battery, and after the engine speed is increased, the generator may recover and transfer kinetic energy of the internal combustion engine into electric energy as the engine speed is reduced, and the electric motor may be driven with the electric energy supplied from the electric generator and the battery, so as to maintain the engine speed within the predetermined range. The generator may be one of the plural electric machines including the motor.

In an alternative embodiment of the present invention, the internal combustion engine may be part of powertrain having an electric motor capable of supplying torque to vehicle wheels, and the torque from the electric motor may increase its output torque during the predetermined period, so as to maintain a vehicle speed within a predetermined range. The electric motor may be a plurality of motors, such as two electric machines at least one of which is usually generating electric energy as a generator but occasionally generating output torque or mechanical energy in a hybrid electric vehicle powertrain.

In the above embodiment, the vehicle powertrain may further comprise a battery supplying electric energy to the electric motor and a generator driven by the internal combustion engine to generate and selectively supply electric energy to the electric motor and the battery. The electric motor may increase its torque during the predetermined period in response to a first operating condition of the battery, the internal combustion engine may increase its rotational speed prior to the predetermined period in response to a second operating condition of the battery, the electric generator may recover and transform kinetic energy of the internal combustion engine into electric energy as the engine speed is reduced, and the electric motor may be driven with the electric energy supplied from the electric generator and the battery, so as to maintain the vehicle speed within the predetermined range. The generator may be one of the plurality of electric machines including the motor.

In the embodiments of the present invention, the first fuel may be gasoline, alcohol such as ethanol, natural gas such as compressed natural gas and liquidized propane gas, or other hydrocarbon fuels. The second fuel may be hydrogen such as gaseous hydrogen, or gaseous fuel such as compressed natural gas and liquidized propane gas.

Also in the embodiments of the present invention, the engine may still rotate during the predetermined period so as to scavenge the combustion chamber and the intake system so that the occurrence of abnormal combustion can be prevented.

BRIEF DESCRIPTION OF THE DRAWINGS

The advantages described herein will be more fully understood by reading an example of an embodiment in which the invention is used to advantage, referred to herein as the Detailed Description, with reference to the drawings wherein.

DETAILED DESCRIPTION OF THE INVENTION

Figure 1:
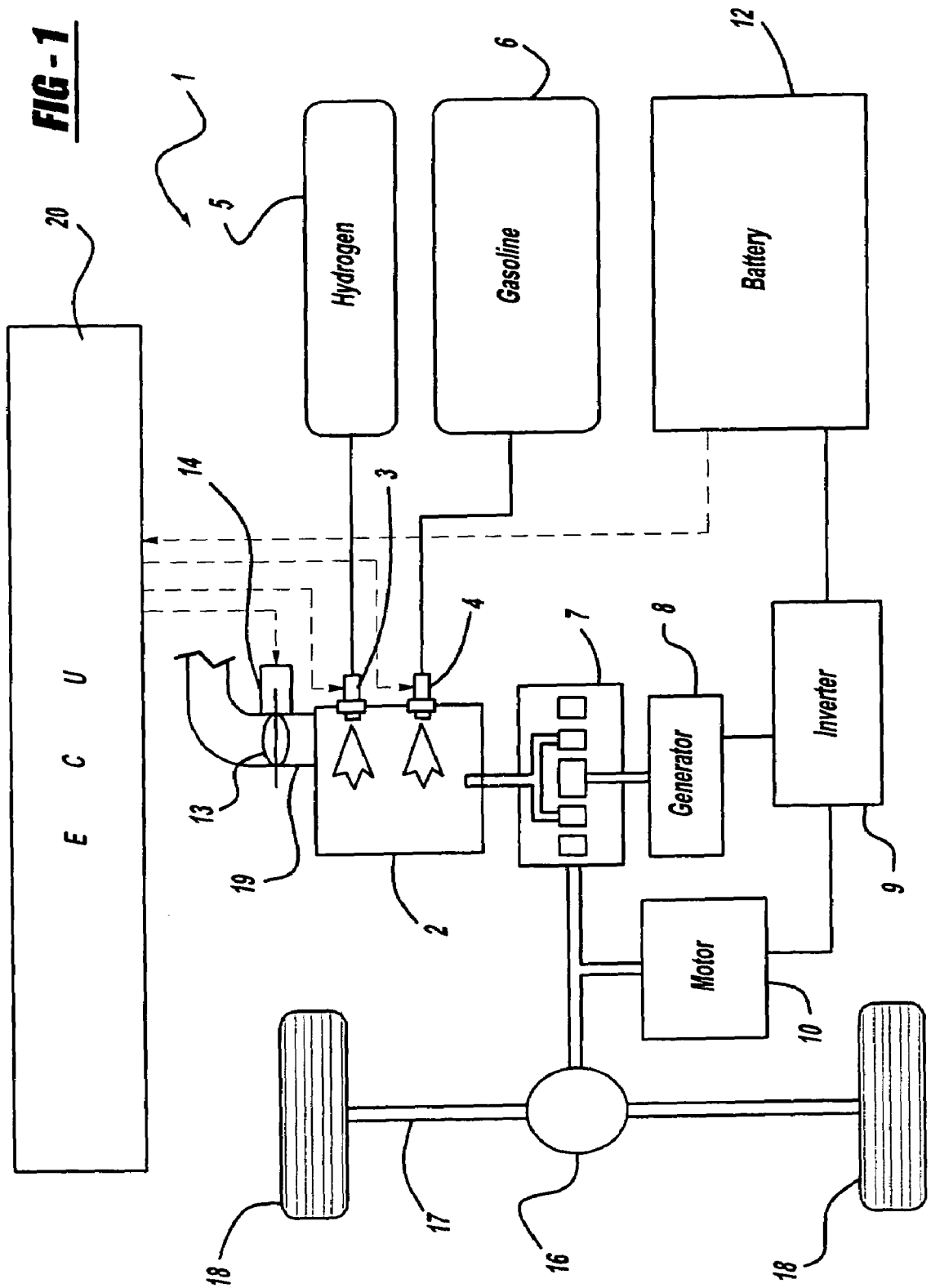
FIG. 1 is a schematic diagram of a vehicle powertrain having an internal combustion engine combusting bi-fuel, a battery, an electric motor and an electric generator, adopted for an embodiment of the present invention.

FIG. 1 is a schematic representation of a powertrain 1 having a dual fuel internal combustion engine 2 using bi-fuel (two kinds of fuels) of gasoline and gaseous hydrogen or selectively combusting them, an electric drive motor 10, and its control system including an electronic control unit (hereinafter referred to ECU) 20. The powertrain 1 basically consists of the engine 2, a power split mechanism 7, an electric generator 8, an electric drive motor 10 and a reduction gear set 16. Power from the engine 2 is divided by the power split mechanism 7 into two, one of which is transferred to the generator 8 and the other of which is transferred to the reduction gear set 16. The reduction gear set 16 consists of a differential gear, and is attached to an axis 17 both ends of which have vehicle driving wheels 18.

The engine 2 is a dual fuel engine using together gaseous hydrogen and gasoline and combust them in its combustion chambers to generate driving torque. The engine 2 has preferably multiple cylinders in a conventional reciprocating engine or multiple rotors in a rotary engine application, in other words multiple combustion chambers. The engine 2 is shown having a hydrogen injector 3 and gasoline injector 4 coupled thereto for delivering gaseous hydrogen and gasoline respectively to the combustion chamber in proportion of pulse width of signal from ECU 20. Although only one hydrogen injector 3 and gasoline injector 4 are illustrated, two respective injectors are preferably provided for each of the combustion chambers. Although the injectors 3 and 4 are shown coupled to the engine 2 itself to directly inject fuel into the combustion chamber, they may be coupled to an intake system 19 to indirectly deliver fuel into the combustion chamber. Also one of the injectors 3 and 4 may be for the direct injection while the other may be for the indirect (or port) injection. The injectors 3 and 4 are connected respectively to hydrogen supply system 5 and gasoline supply system 6 which store high pressure gaseous hydrogen and gasoline in respective tanks and supply them under control of the ECU 20 through the signals to the respective injectors 3 and 4 from the ECU 20. The intake system 19 has a throttle valve 13 to adjust amount of air inducted into the combustion chamber of the engine 2. The throttle valve 13 is operated by a throttle valve actuator 14 under control of the ECU 20.

The powertrain 1 also has a battery 12 which stores electric energy, power, charge or electricity as driving source of the electric motor 10. The battery 12 supplies electric energy to the drive motor as well as stores electric power generated by the electric generator 8. Occasionally, the electric power from the battery 12 is supplied to the electric generator 8, which functions as an electric motor then. Also, the electric motor 10 may supply electric energy to the battery during a vehicle deceleration, which is so called regenerative braking. Further, an inverter circuit 9 is provided which performs transformation between AC current of the generator 8 or the electric motor 10 and DC current of the battery 12 and controls electric current flow between the generator 8, the motor 10 and the battery 12. Alternatively, the electric power generated by the generator 8 may be directly used as a driving source of the motor 10 through the inverter circuit 9 rather than stored in the battery 12.

The ECU 20 is a generic control apparatus and performs operational control of various components such as the powertrain 1, the injectors 3 and 4, the electric generator 8, the inverter circuit 9, the electric motor 10, the battery 12, the throttle valve 13, and others (not specifically illustrated), based on information detected from various on board sensors (not specifically illustrated, but, e.g. an airflow sensor, a water temperature sensor, an engine rotational speed sensor, an intake air temperature sensor, a battery charge sensor, etc.). The ECU 20 comprises therein a microcomputer (not shown) which performs processing such as correction, computation, determination, etc. in the various operational control, and includes a microprocessor and memories that store data including that representing instructions executable by the microprocessor elements.

Figure 2:
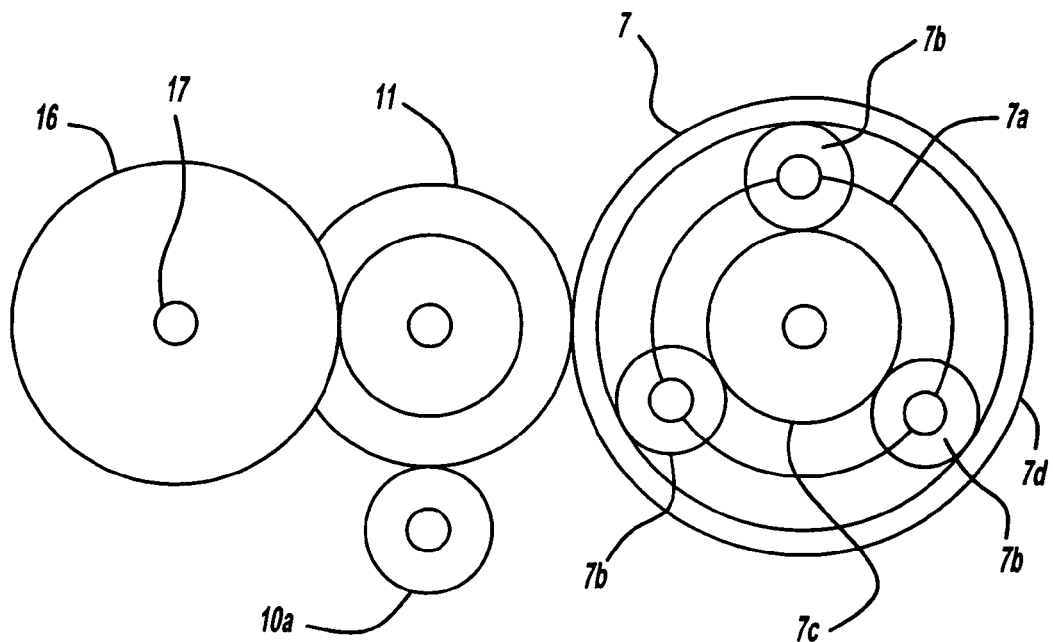
FIG. 2 is a graphical representation of a transmission including a power split mechanism of the vehicle powertrain shown in FIG. 1.

Now, the power split mechanism 7 will be described in detail. FIG. 2 shows a schematic representation of various components of a power transmission mechanism within the powertrain 1 including the power split mechanism 7. In this embodiment, the power split mechanism 7 is a planetary gear set, where its rotational axis of planetary carrier 7a is connected to the engine 2 and the engine output is transmitted through pinion gears 7b carried on the planetary carrier 7a to a sun gear 7c and a ring gear 7d. A rotational axis of the sun gear 7c is connected to the generator 8, which generates electric power or electricity with mechanical power transmitted from the sun gear 7c. On the other hand, the ring gear 7d is engaged with an intermediate gear 11 positioned in an outside proximity, through which power from the ring gear 7d is transmitted to the reduction gear 16, then eventually to the vehicle wheels 16 through the axles 17 shown in FIG. 1. The intermediate gear 11 also engages with an output gear 10a directly connected to a rotational axis of the electric motor 10, power from which is transmitted through the intermediate gear 11 to the reduction gear 16, then eventually to the vehicle wheels 16, along with the power from the ring gear 7d.

Figure 3:
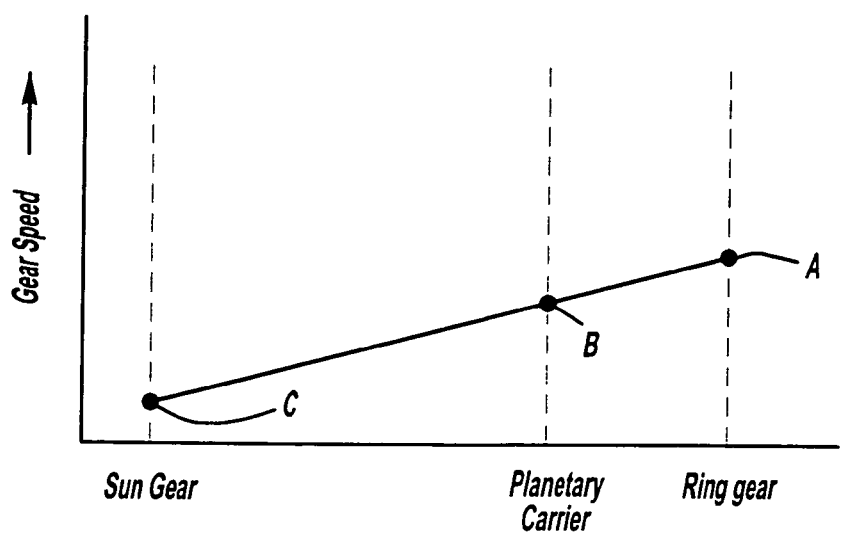
FIG. 3 is a collinear diagram of the rotational speeds of planetary carrier, sun gear and ring gear respectively corresponding to the rotational speeds of engine, generator and motor.

Next, characteristic of the power split mechanism 7 will be described. FIG. 3 shows a rotational speed based collinear diagram of the planetary carrier 7a, the sun gear 7c and the ring gear 7d of the power split mechanism 7. As is clear from this diagram, between rotational speeds of the respective gears there is a linear relationship or a relationship which always aligns them together on one straight line and respectively on fixed vertical lines (see points A, B and C) due to the mechanical principle of planetary gear set. The engaging mechanism of the gears shown in FIG. 2 causes a rotational speed of the planetary carrier 7a to vary corresponding to the engine rotational speed and a rotational speed of the ring gear 7d to vary corresponding to rotational speed of the electric motor 10 and the vehicle wheels 18 (vehicle speed). The opposite is similar, that is, the engine rotational speed varies corresponding to the rotational speed of planetary carrier 7a, the rotational speed of generator 8 varies corresponding to the rotational speed of sun gear 7c, and the rotational speeds of electric motor 10 and the vehicle wheels 18 vary corresponding to the rotational speed of ring gear 7d. Further, the engaging mechanism of the gears shown in FIG. 2 causes the rotational speed of ring gear 7d to vary corresponding to various parameters such as the rotational speed of the reduction gear 16 and output torque in addition to the rotational speed of motor 10 and the vehicle speed.

In the power split mechanism 7, corresponding to change in rotational speed of either one of the planetary carrier 7, the sun gear 7c and the ring gear 7d, rotational speeds of the rest of the gears vary while keeping the linear relationship of the rotational speeds of gears aligned together on the one line and respectively on the fixed vertical lines. For example, in a state where the rotational speed of sun gear 7c is fixed to be constant, as the rotational speed of ring gear 7d is increased, the rotational speed of planetary gear 7a increases, while as the rotational speed of ring gear 7d is decreased, the rotational speed of planetary gear 7a decreases. Also, in a state where the rotational speed of ring gear 7d is fixed to be constant, as the rotational speed of sun gear 7c is increased, the rotational speed of planetary gear 7a increases, while as the rotational speed of sun gear 7c is decreased, the rotational speed of planetary carrier 7a decreases. Further, in a state where the rotational speed of planetary carrier 7a is fixed to be constant, as the rotational speed of ring gear 7d is increased, the rotational speed of sun gear 7c decreases, while as the rotational speed of ring gear 7d is decreased, the rotational speed of sun gear 7c increases.

Now, basic control on the powertrain 1 will be described. In the powertrain 1, if engine load required in accordance with a vehicle state is relatively small, the engine 2 is stopped and vehicle wheels 18 are driven only with motor output by the drive motor 10 by supplying electric power from the battery 12 to the electric motor 10. Also if the engine load is at a mid level, electric power supply from the battery 12 to the electric motor 10 is stopped, and the wheels are driven only with engine output. In this case simultaneously electricity generation is performed by the generator 8 and electric power obtained is supplied to the electric motor 10 in accordance with the load and added to the engine torque transmitted from the ring gear 7d. The excess is charged into the battery 12. Further, if the engine load is relatively high, the wheels 18 are driven using motor torque by the electric motor 10 powered by electric power supplied from the battery 12 in addition to the transmitted engine.

Continuing to describe the basic control strategy on the powertrain 1, during vehicle braking, braking energy may be transmitted from the wheels 18 through the axle 17, reduction gears 16, etc. to the electric motor 10, and in this case, the drive motor 10 can be caused to act as a regenerative brake with electricity generation function able to transform the braking energy (mechanical or kinetic energy) into electric power or electricity. The electric power transformed from the braking energy is charged into the battery 12. In other words, the electric motor works as an electric generator.

Referring now to the fuel switching between gaseous hydrogen and gasoline performed by the engine 12, if a predetermined switching condition is met (e.g. if remaining amount of gaseous hydrogen in the hydrogen supply system 5 decreases below a predetermined amount, or if it is determined by a car navigation system that the vehicle has exited out of a city to suburbs), fuel supplied to the engine 2 through the injectors 3 and 4 is automatically switched from gaseous hydrogen to gasoline. On the other hand if the remaining amount of gaseous hydrogen exceeds the predetermined amount by filling the hydrogen supply system or hydrogen tank 5 or if it is determined by the car navigation system that the vehicle has entered a city from suburbs, the fuel is automatically switched from gasoline to gaseous hydrogen. Alternatively the fuel switching may be performed in accordance with a desire of vehicle driver. In particular, a hardware switch arranged such as on a vehicle instrument panel or a software switch arranged on a display screen such as for the vehicle navigation switch may be provided for the driver to switch fuel between gasoline and hydrogen.

In this embodiment, in the fuel switching from gasoline to gaseous hydrogen where vehicle speed is above the predetermined or where it is accelerated, after the gasoline supply is stopped, the fueling into the cylinders of engine 2 is suspended until the gaseous hydrogen supply is commenced or the fueling is resumed after a predetermined period since the stop of fuel supply. While the fueling is suspended, the engine 2 is still rotated with inertia of the engine 2, the generator 8, the motor 10 and other rotational components of the powertrain 1. By rotating the engine 2 with no fuel supply, fresh air is inducted into and pumped out of the combustion chamber and the intake system 19 of engine 2 to scavenge the combustion chamber and the intake system with the fresh air so as to have no gasoline left there, thereby preventing occurrence of abnormal combustion at a beginning of gaseous hydrogen supply. The period of the fueling suspension may be set based on time or number of engine cycles or rotations, which is long enough to clear out the residual gasoline but short enough to prevent an excess engine speed reduction as described below in detail.

Conventionally, if the fueling into the engine is stopped and suspended for a certain period, the engine speed will decrease and enough output torque to keep the vehicle speed at the beginning of fuel switching can not be sustained, because only the inertia of powertrain 1 is not enough to keep the speed. Then a driving state may become unstable. To avoid such a situation, it is desirable to suppress the decrease of engine speed during the fueling suspension period. In other words, it is desirable to maintain the engine speed at the end of fuel switching to be equal to the speed at the beginning of fuel switching, or to maintain the output torque to maintain the vehicle speed at the beginning of fuel switching.

To realize the above, 1) the electric drive motor 10 and the electric generator 8 as a motor are activated, or 2) the engine speed is increased just before the fueling suspension. Before the fueling suspension, the engine load state and state of charge (SOC) of the battery 12 is detected, and either of the methods is appropriately selected and performed depending on capacity of the motor 10 determined based on the various conditions detected. In particular, at first currently generated engine power is determined based at least on the engine load and engine rotational speed detected by the various onboard sensors. Then, maximum power which the electric motor 10 can currently generate is determined based on a rated output and a current speed of the electric motor 10. If the current engine power is equal to or less than the maximum motor power, and if the SOC of battery 12 is higher than a predetermined amount (e.g. when it is in fully charged state), it is determined that the capacity of electric motor 10 is high enough, in other words, that it is possible to maintain the output torque at the beginning of fuel switching with operation of the electric motor 10, then the electric motor 10 is operated. On the other hand, if the engine load exceeds the maximum motor power, or the SOC of battery 12 is lower than the predetermined amount even though the current engine power is below the maximum motor power, it is determined that the capacity of drive motor is not high enough, or that it is impossible to keep the output torque at the beginning of fuel switching with the operation of drive motor 10, then just before the fueling suspension, the throttle valve 13 and/or the gasoline injector 4 are controlled in order to increase the engine speed.

Meanwhile, the engine load state may be detected based on such as opening of the throttle valve 13, intake airflow rate or intake manifold pressure, and on the other hand, the SOC of battery 12 may be detected by using known methods such as integrating electric current balance while correcting it with battery temperature or electric voltage.

Figure 4:
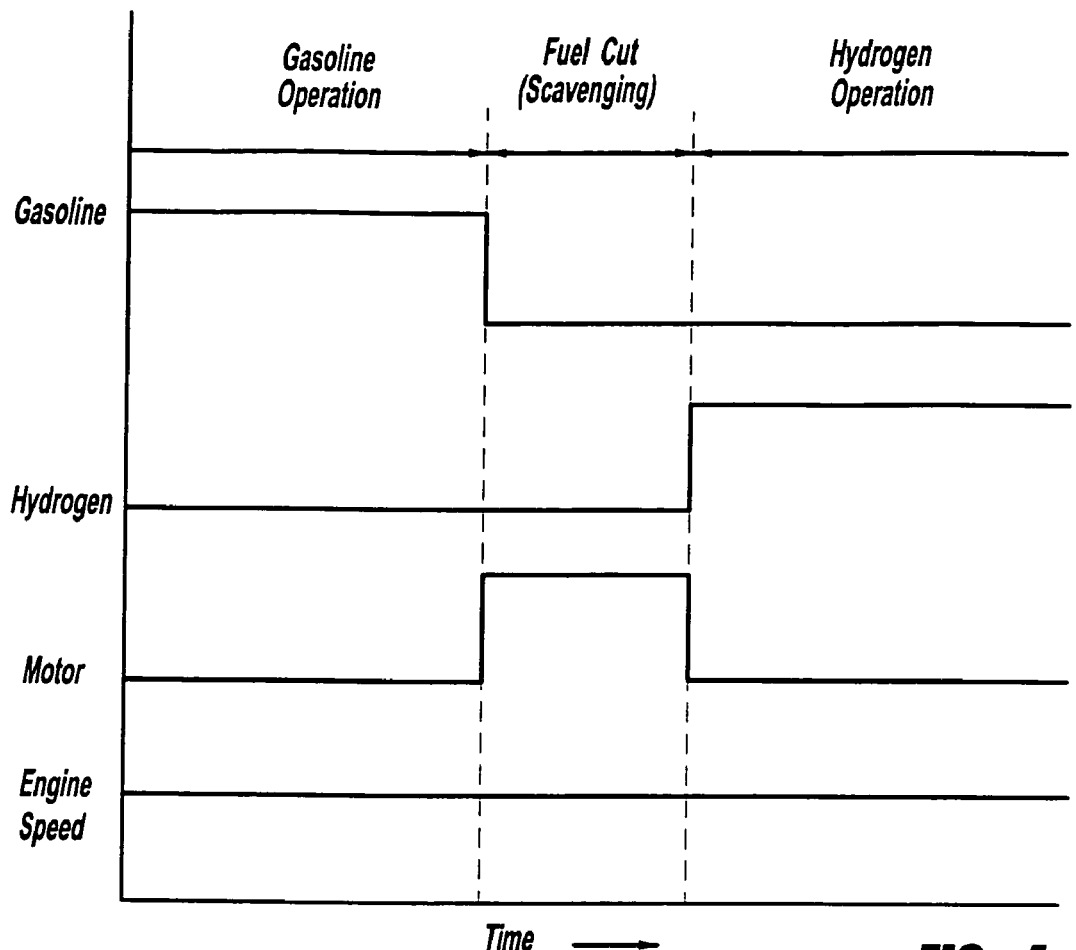
FIG. 4 is a time chart showing changes in gasoline supply, hydrogen supply, motor torque and engine speed during the fuel switching when the motor torque is utilized to compensate the engine output torque.

FIG. 4 shows a graphical representation conceptually depicting changes in various parameters (gasoline supply, hydrogen supply, motor output, engine rotational speed) in a case where the electric motor 10 is operated upon fuel switching from gasoline to gaseous hydrogen. During the fueling suspension period, if the electric motor 10 is operated to sustain output torque to keep the vehicle speed at the beginning of fuel switching, the electric motor 10 is operationally controlled so that motor output can be obtained to establish rotational speed of the ring gear 7d corresponding to the vehicle speed at the beginning of fuel switching. At this time, the rotational speed of sun gear 7c is maintained to be constant by driving the generator 8 as a torque generating motor with the electricity from the battery 12 to compensate negative torque from the engine 2, or in other words, to supply torque to the engine 2, during the fueling suspension. So, a rotational speed of the planetary carrier 7a at the beginning of fuel switching is sustained based on the characteristic of power split mechanism 7 shown in FIG. 3 by maintaining the speed of sun gear 7c, thereby, the engine rotational speed at the beginning of fuel switching will be sustained during the fueling suspension period. In this case, upon the fuel switching from gasoline to gaseous hydrogen, points A, B and C in FIG. 3, which are respectively representing the rotational speeds of ring gear 7d, planetary carrier 7a and sun gear 7c, do not move, because the speeds of ring gear 7d and sun gear 7c are maintained by driving the motor 10 and the generator 8. The engine rotational speed and rotational speed of ring gear 7d which is corresponding to vehicle speed are respectively detected by rotational speed sensors (not shown) and compared to the values at the beginning of fueling suspension. Based on the comparisons, the electrical power supply to the motor 10 and generator 8 through the inverter circuit is controlled by the ECU 20 to maintain the engine speed and vehicle speed within predetermined ranges.

Figure 5:
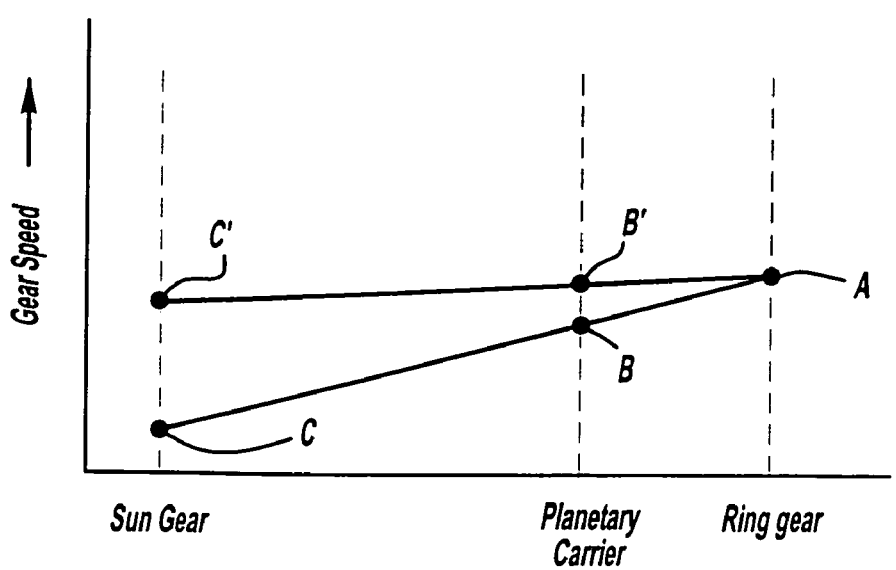
FIG. 5 is a collinear diagram depicting a relationship between the rotational speeds of planetary carrier, sun gear and ring gear when the rotational speed of planetary gear is increased while the rotational speed of ring gear is fixed.

On the other hand, upon the fuel switching from gasoline to gaseous hydrogen through the fueling suspension period, if the current engine power exceeds the maximum motor power such as where the vehicle is driving at high speed, or if the SOC of battery 12 is lower than the predetermined amount even though the current engine power is below the maximum motor power, the engine rotational speed is increased while output torque of powertrain 1 is sustained to keep the vehicle speed. Thereby, during the fueling suspension period, engine rotational speed decrease beyond the engine rotational at the beginning of fuel switching is suppressed or it is maintained within the predetermined range. FIG. 5 is a collinear diagram based on the rotational speeds of planetary carrier 7a, sun gear 7c and ring gear 7d just after engine rotational speed has been increased from the condition shown in FIG. 3, while the output torque is sustained. As is clear from this diagram, if it is determined that the capacity of drive motor 10 is not high enough, the engine speed is compulsorily increased to sustain the output torque after the fueling suspension or the predetermined period by controlling the throttle valve 13 to be more opened, the gasoline injector 4 to inject more fuel and/or the generator 8 to generate less electricity or more torque while rotational speed of the ring gear 7d is kept at the point A, and accordingly the rotational speed of planetary carrier 7a which is in proportion with the engine rotational speed increases from the point B to a point B'. Also, accompanied with this, rotational speed of the sun gear 7c increases from the point C to a point C', based on the characteristic of power split mechanism 7 described above. It is determined how much engine speed is increased prior to the fueling suspension depending on a prediction of how much engine speed decreases during the fueling suspension for the predetermined period. When output torque of the ring gear 7d is increased due to the engine speed increase operation, the excessive torque is absorbed by using generator 8 and the motor 10 for electricity generation so as to maintain the rotational speed of ring gear 7d at the point A.

Subsequently, once the fueling is suspended, the engine rotational speed is gradually decreasing, and according to this, the rotational speed of planetary carrier 7a decreases from the point B' to the point B. During this fueling suspension, the combustion chamber and the intake system 19 of the engine 2 are scavenged with the engine 2 rotating with no fuel supplied as described above. At this time, the rotational speed of sun gear 7c gradually decreases from the point C' to the point C, as well. So, while the rotational speeds of planetary carrier 7a and sun gear 7c are decreasing, the inertia of the engine 2 and the generator 8 is supplemented to the output of the electric motor 10 through the power split mechanism 7. The inertia of the engine 2 and the generator 8 may be utilized through the sun gear 7c for electricity generation at the generator 8. The electricity generated through it is supplemented to the electric power to drive the motor 10 in addition to that from the battery 12. At a time when the rotational speed of planetary carrier 7a has decreased generally to the point B, or when the engine rotational speed has decreased to engine rotational speed in the gasoline operation, hydrogen is supplied and the hydrogen operation is commenced.

Figure 6:
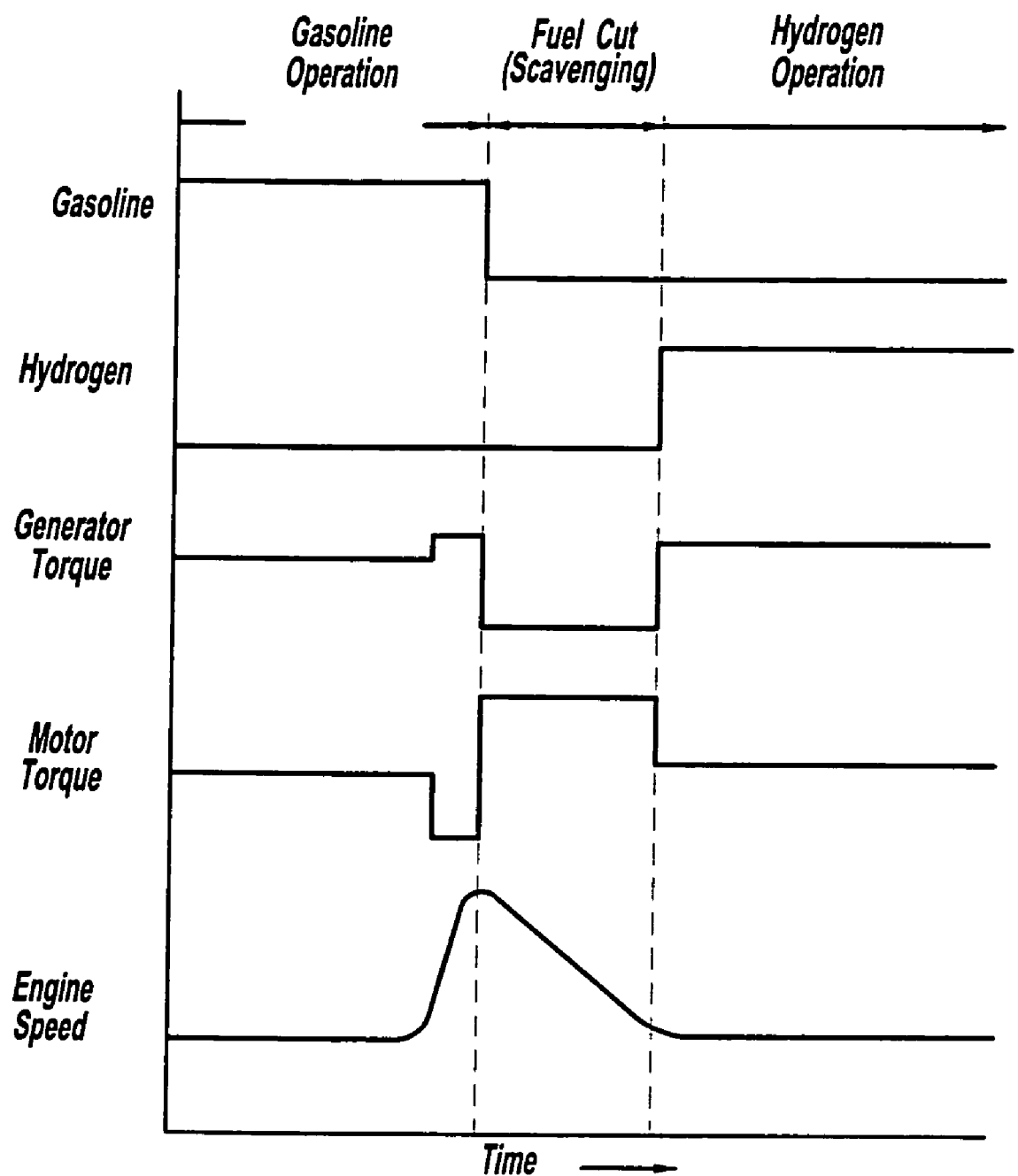
FIG. 6 is a time chart showing changes in gasoline supply, hydrogen supply and engine speed during the fuel switching when the engine speed is increased.

FIG. 6 shows a graphical representation conceptually depicting changes in various parameters (gasoline supply, hydrogen supply, generated electricity from generator 8, output of motor 10 and engine rotational speed) in a case where the engine speed is increased just before the fueling suspension upon the fuel switching from gasoline to gaseous hydrogen. As can be seen from this diagram, although the engine rotational speed decreases during the fueling suspension period, engine rotational speed is maintained within the predetermined range by compulsorily increasing the engine rotational speed just before gasoline is stopped to be supplied.

Figure 7:
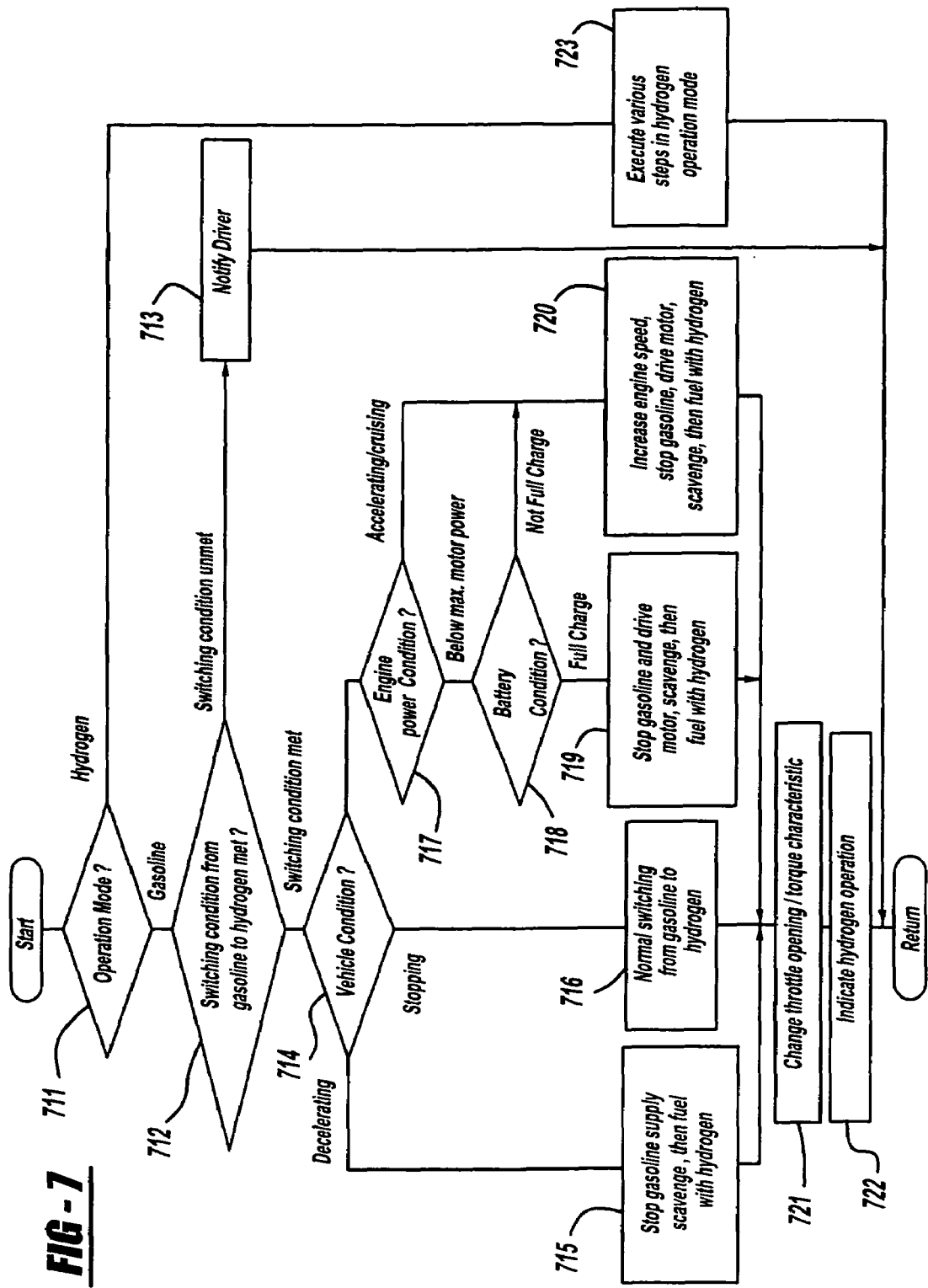
FIG. 7 is a flowchart showing the fuel switching process from gasoline to gaseous hydrogen in accordance with the present invention.

FIG. 7 is a flow chart for a routine of the fuel switching process from gasoline to gaseous hydrogen out of various control processes executed by the ECU 20. In this routine, at first it is determined which one of the hydrogen operation mode where gaseous hydrogen is inducted into the engine 2 and the gasoline operation mode where gasoline is inducted into the engine 2 is a current operation mode (block 711). If the result is the hydrogen operation mode, various steps at the hydrogen operation mode are executed (block 723), then subsequently it is returned to the main routine.

On the other hand, if as a result of the block 711 the operation mode is the gasoline mode, subsequently it is determined whether the switching condition from gasoline to gaseous hydrogen is met (block 712). In particular, when a remaining amount of gasoline is less than the predetermined amount, or when there is a desire of vehicle driver for the hydrogen operation, and if the remaining amount of hydrogen is sustained enough to maintain a stable driving state, it is determined that the switching condition is met and the routine proceeds to a block 714. On the other hand, if it is determined that the switching condition is not met, it is notified to the driver that a switching at that point of time is impossible, then it is returned to the main routine.

It is determined at a block 714 which one of decelerating, stopping and cruising or acceleration the vehicle state is. If as a result of the block 714 the vehicle is decelerating, the routine proceeds to the block 715 where fueling (gasoline supply) is stopped (fuel cut), the engine 2 is scavenged during the fueling suspension period, then a switching from gasoline to gaseous hydrogen is performed after the scavenging. During the deceleration, it is not necessary to maintain the engine speed and the powertrain output torque, or to suppress decrease of engine speed such as operation of the drive motor 10 or increase of the engine speed. Then the routine proceeds to a block 721.

Also, if it is determined that the vehicle is stopping as a result of the block 714, normal switching from gasoline to gaseous hydrogen is performed at a block 716. During stopping, as engine rotational speed is low or engine rotational speed is zero, a possibility that abnormal combustion may occur is low, then switching from gasoline to gaseous hydrogen is performed through no fueling suspension. Then the routine proceeds to the block 721.

Further, if it is determined that the vehicle is accelerating or cruising as a result of the block 714, the routine proceeds to a block 717 where the currently generated power of the engine 2 is determined and compared to the maximum power obtainable from the motor 10 as described above. If as a result of the block 717 it is determined the current engine power exceeds the maximum motor power, considering that it is impossible to maintain the output torque at the beginning of fuel switching by only using the operation of the drive motor 10, the routine proceeds to a block 720, where, as described above, just before the fueling is stopped, engine speed is increased to sustain higher engine speed, the engine 2 is scavenged during the fueling suspension period, at the same time the electric motor 10 is driven with the electricity from the generator 8 and the battery 12, then after the scavenging, the fueling is resumed by commencing to supply gaseous hydrogen. Then the routine proceeds to the block 721.

On the other hand, if it is determined at the block 717 that the current engine power is below the maximum motor torque, then at a block 718 it is determined whether the battery 12 is in a fully charged state. If it is determined at the block 718 that the battery 12 is not in the fully charged state, considering that it is impossible to maintain the output torque at the beginning of fuel switching, the routine proceeds to the block 720, where the above described switching from gasoline to gaseous hydrogen is performed. On the other hand, if it is determined at the block 718 that the battery 12 is in the fully charged state, considering that it is possible to maintain the output torque at the beginning of fuel switching with the operation of the drive motor 10, the routine proceeds to a block 719, where the drive motor 10 is temporarily operated associated with the fueling suspension, during this fueling suspension period the engine 2 is scavenged, and after the scavenging the fueling is resumed by commencing to supply gaseous hydrogen. Then the routine proceeds to the block 721.

At the block 721, associated with fuel switching from gasoline to gaseous hydrogen, a throttle opening characteristic to accelerator position (torque characteristic) is changed. Then the routine proceeds to a block 722, where an indication is made for notifying the driver that gasoline operation is being done at that point of time. For example, this indication may be illumination of a dedicated indication lamp on the instrument panel, or a notation of "Hydrogen Operation" on a display screen for the car navigation system. Then the routine for the fuel switching process from gasoline to gaseous hydrogen is completed and returned to the main routine.

As is clear from the above description, according to the present invention, in the powertrain having the engine using bi-fuel of gasoline and gaseous fuel, upon the fuel switching from gasoline to gaseous hydrogen, by suspending fueling and scavenging the engine, the occurrence of abnormal combustion can be prevented, and further, during the fueling suspension period, by suppressing decrease of engine speed beyond that in the gasoline operation or at the beginning of fuel switching, a stable driving state can be sustained. Further, since, as means for suppressing the decrease of engine rotational speed, either of driving the motor and increase of engine speed is selected depending on the engine load state or the SOC of battery 12, during the fueling suspension period to prevent occurrence of abnormal, a stable driving state can be certainly sustained.

It is needless to say that this invention is not limited to the illustrated embodiment and that various improvements and alternative designs are possible without departing from the substance of this invention as claimed in the attached claims. While in the embodiment above the engine is using together gasoline and gaseous hydrogen, the fuel is not limited to this combination and other fuels such as compressed natural gas and liquidized propane gas may be used in stead of the gaseous hydrogen. Further other fuels such as ethanol and compressed natural gas may be used in stead of the gasoline.

The invention claimed is:

1. Method for controlling an internal combustion engine combusting a first fuel or a second fuel, the method comprising:
   supplying the first fuel to at least one combustion chamber of said internal combustion engine;
   stopping the supply of said first fuel to said at least one combustion chamber for a predetermined period;
   maintaining a rotational speed of said internal combustion engine within a predetermined range during said predetermined period; and
   fueling with the second fuel to said at least one combustion chamber after said predetermined period.

2. The method of claim 1, wherein said internal combustion engine is part of a vehicle powertrain having an electric motor capable of supplying torque to said internal combustion engine, and wherein the method further comprises increasing the torque of said electric motor to said internal combustion engine during said predetermined period.

3. The method of claim 1, wherein the rotational speed of said internal combustion engine is increased prior to said predetermined period.

4. The method of claim 1, wherein said internal combustion engine is part of a vehicle powertrain having an electric motor capable of generating torque to said internal combustion engine and a battery for storing and supplying electric energy to said electric motor, and wherein said maintaining the rotational speed of said internal combustion engine is performed by:
   increasing the output torque of said electric motor during said period in response to a first operating condition of said battery; and
   increasing the rotational speed of said internal combustion engine prior to said period in response to a second operating condition of said battery.

5. The method of claim 4, wherein said vehicle powertrain further comprises an electric generator driven by said internal combustion engine and generating electric energy to selectively supply it to said electric motor and said battery, and wherein the method is further comprised of: after the rotational speed of said internal combustion engine is increased,
   recovering and transforming kinetic energy of said internal combustion engine into electric energy through said electric generator as the rotational speed of said internal combustion engine is reduced; and
   driving said electric motor with the electric energy supplied from said electric generator and said battery.

6. The method of claim 1, wherein said internal combustion engine is part of a vehicle powertrain having an electric motor capable of supplying torque to vehicle wheels, and wherein the method further comprises increasing the torque from said electric motor during said predetermined period.

7. The method of claim 6, wherein said vehicle powertrain further comprises a battery supplying electric energy to said electric motor and a generator driven by said internal combustion engine to generate and selectively supply electric energy to said electric motor and said battery, and wherein the method is further comprised of:
   increasing the output torque of said electric motor during said period in response to a first operating condition of said battery;
   increasing a rotational speed of said internal combustion engine prior to said period in response to a second operating condition of said battery;
   recovering and transforming kinetic energy of said internal combustion engine into electric energy through said electric generator as the rotational speed of said internal combustion engine is reduced; and
   driving said electric motor with the electric energy supplied from said electric generator and said battery.

8. The method of claim 1, wherein said first fuel is gasoline and said second fuel is gaseous hydrogen.

9. The method of claim 1, wherein said first fuel is stopped in response to an engine operating condition.

10. The method of claim 9, wherein said engine operating condition is determination to switch fuel from the first fuel to the second fuel based on driving condition of a vehicle equipped with said internal combustion engine.

11. Vehicle powertrain comprising:
   an internal combustion engine combusting a first fuel or a second fuel;
   a fuel supply system configured to selectively supply the first fuel or the second fuel into combustion chambers of said internal combustion engine;
   an electric motor capable of supplying torque to said internal combustion engine; and
   a control system configured to control said fuel supply system to:
      supply the first fuel to at least one of said combustion chambers;
      stop the supply of said first fuel to said at least one combustion chamber;

control said electric motor to increase its torque so as to maintain a rotational speed of said internal combustion engine within a predetermined range for a predetermined period; and fuel with the second fuel to said at least one combustion chamber after said predetermined period.

12. Vehicle powertrain comprising:

an internal combustion engine combusting a first fuel or a second fuel;

a fuel supply system configured to selectively supply the first fuel or the second fuel into combustion chambers of said internal combustion engine; and a control system configured to control said fuel supply system to:
   supply the first fuel to at least one of said combustion chambers;
   stop the supply of said first fuel to said at least one combustion chamber; and
   fuel with the second fuel to said at least one combustion chamber after a predetermined period, and wherein said control system is further configured to control said vehicle powertrain to maintain a rotational speed of said internal combustion engine within a predetermined range during said predetermined period.

13. The vehicle powertrain of claim 12, further comprising:

an electric motor capable of supplying torque to vehicle wheels; and a battery for storing and supplying electric energy to said electric motor, and wherein said control system is further configured to:

increase the output torque of said electric motor during said predetermined period in response to a first operating condition of said battery; and increase a rotational speed of said internal combustion engine prior to said period in response to a second operating condition of said battery.

14. The vehicle powertrain of claim 13, further comprising: an electric generator driven by said internal combustion engine and generating electric energy to selectively supply it to said electric motor and said battery, and wherein said control system is further configured to: after the rotational speed of said internal combustion engine is increased, control said electric generator to recover and transform kinetic energy of said internal combustion engine into electric energy as the rotational speed of said internal combustion engine is reduced; and control said electric generator and said battery to supply their electricity to said electric motor to drive it.

15. The vehicle powertrain of claim 12, further comprising an electric motor capable of supplying torque to vehicle wheels, and wherein said control system is further configured to control said electric motor to increase its driving torque during said predetermined period.

16. The vehicle powertrain of claim 15, further comprising:

a battery for storing and supplying electric energy to said electric motor; and a generator driven by said internal combustion engine to generate and supply electric energy to said electric motor and said battery, and wherein said control system is further configured to:
   control said electric motor to increase its torque during said period in response to a first operating condition of said battery;
   control said internal combustion engine to increase its rotational speed prior to said period in response to a second operating condition of said battery;
   control said electric generator to recover and transform kinetic energy of said internal combustion engine into electric energy as the rotational speed of said internal combustion engine is reduced; and
   drive said electric motor with the electric energy supplied from said electric generator and said battery.

17. The vehicle powertrain of claim 12, wherein said first fuel is gasoline and said second fuel is gaseous hydrogen.

18. The vehicle powertrain of claim 12, wherein said control system is further configured to control said internal combustion engine to rotate during said predetermined period to scavenge said at least one combustion chamber.

19. The vehicle powertrain of claim 12, wherein said control system is further configured to control said internal combustion engine to increase its rotational speed prior to said predetermined period.

* * * * *